US012797270B2

(12) United States Patent
Benedini

(10) Patent No.: US 12,797,270 B2
(45) Date of Patent: Nov. 17, 2026

(54) AUXILIARY TRACTION DEVICE FOR WHEELCHAIRS FOR THE DISABLED

(71) Applicant: Klaxon Mobility GMBH, Arnoldstein (AT)

(72) Inventor: Antonio Benedini, Barbarano Mossano (IT)

(73) Assignee: Klaxon Mobility GMBH, Arnoldstein (AT)

( * ) Notice: Subject to any disclaimer, the term of this patent is extended or adjusted under 35 U.S.C. 154(b) by 294 days.

(21) Appl. No.: 18/706,330

(22) PCT Filed: May 5, 2023

(86) PCT No.: PCT/IB2023/054698
§ 371 (c)(1),
(2) Date: Apr. 30, 2024

(87) PCT Pub. No.: WO2023/214372
PCT Pub. Date: Nov. 9, 2023

(65) Prior Publication Data

US 2026/0137568 A1 May 21, 2026

(30) Foreign Application Priority Data

May 6, 2022 (IT) ........................ 102022000009368

(51) Int. Cl.
*A61G 5/04* (2013.01)
*A61G 5/10* (2006.01)

(52) U.S. Cl.
CPC ........... *A61G 5/047* (2013.01); *A61G 5/1051* (2016.11)

(58) Field of Classification Search
CPC .............................. A61G 5/047; A61G 5/1051
(Continued)

(56) References Cited

U.S. PATENT DOCUMENTS 4,503,925 A * 3/1985 Palmer .................. A61G 5/047
180/13

FOREIGN PATENT DOCUMENTS

FR 1 535 022 A 8/1968
GB 1197909 7/1970

OTHER PUBLICATIONS

International Search Report and Written Opinion dated Sep. 8, 2023, issued in PCT Application No. PCT/IB2023/054698, filed May 5, 2023.

* cited by examiner

*Primary Examiner* — Valentin Neacsu
*Assistant Examiner* — Felicia L. Brittman-Alabi
(74) *Attorney, Agent, or Firm* — Workman Nydegger

(57) ABSTRACT

An auxiliary traction device for wheelchairs includes a support structure to which a drive wheel is rotatably coupled having a wheel operatively connected to an electric motor, an electronic control unit configured to control the electric motor, a connection assembly rotatably associated to the support structure so as to define a steering axis (Y) of the support structure and of the drive wheel relative to the connection assembly. The auxiliary traction device also includes a hooking body defined coaxially to the steering axis (Y), rotatably coupled to the connection assembly and integrally connected with a first end thereof to the support structure. Such a hooking body is provided, at the second end, opposite to the first end, with a hooking shaping so as to allow the operating hooking of an external accessory device provided with a counter-shaping complementary to the hooking shaping.

14 Claims, 11 Drawing Sheets

(58) Field of Classification Search
USPC .......................................................... 180/15
See application file for complete search history.

AUXILIARY TRACTION DEVICE FOR WHEELCHAIRS FOR THE DISABLED

BACKGROUND OF THE DISCLOSURE

1. The Field of the Disclosure

The invention relates to an auxiliary traction device for wheelchairs for the disabled.

The invention also relates to some auxiliary traction systems, where each comprises the aforementioned auxiliary traction device associated with a specific accessory device.

Furthermore, the invention relates to a method for fastening the aforementioned auxiliary traction device to a wheelchair for the disabled.

2. The Relevant Technology

It is well known that people with motor impairment in their lower limbs need to use special wheelchairs for the disabled in order to be able to move around autonomously, semi-autonomously, or to be moved by a caregiver.

It is equally well known that such wheelchairs for the disabled comprise a frame on which a seat for the disabled person is obtained and to which a pair of main, rear, generally larger wheels and a pair of front, smaller, pivoting wheels are rotatably coupled.

Normally, wheelchairs are provided with handrails associated with the rear wheels, which are available to the disabled person for manually pushing the same wheelchair.

However, disadvantageously, this simple configuration of the manually pushed wheelchair does not make it possible for the disabled person to push the same wheelchair for long distances, or along particularly steep ascents, as the effort required would be excessive and there is a risk of jeopardising one's own safety.

In order to overcome these problems, in the past, motorised wheelchairs for the disabled were developed and placed on the market, i.e., wheelchairs provided with an integrated electric motor, adapted to rotate the rear wheels, a battery-pack to power the aforementioned electric motor, and a control device that can be commanded by the disabled person to control the functionality of the wheelchair.

However, these types of wheelchairs for the disabled have two main drawbacks.

A first acknowledged drawback is that motorised wheelchairs for the disabled are expensive and cost much more than manual wheelchairs.

In addition, motorised wheelchairs for the disabled are bulky and certain movements and procedures, that are normally possible with manual wheelchairs, are impossible to make.

For example, with a motorised wheelchair it would be impossible for a disabled person to use the car autonomously and load the wheelchair into it, as is the case with manual folding-type wheelchairs.

In order to achieve a compromise between these two solutions, auxiliary traction devices have been developed over the past two decades to be removably coupled, alternatively at the front or at the rear, to manual wheelchairs for the disabled, so as to make the latter motor-driven.

In particular, with regard to auxiliary traction devices that can be coupled exclusively to the front of the wheelchair, they usually comprise a tubular column and a steering unit, which in turn comprises a steering tube that can be rotatably inserted into the aforementioned tubular column. At its first end, the steering tube is associated to a wheel and, at its second end, it is associated with steering means, such as a handlebar.

Furthermore, the auxiliary traction systems of the known type comprise motion-generating means, preferably an electric motor with an associated battery-pack, associated with the wheel so as to operate the rotation thereof.

Furthermore, the auxiliary traction devices of the prior art must necessarily comprise a connection assembly in order to achieve a stable and secure connection with the said wheelchair, in a front position relative to the rotation axis of the rear wheels of the wheelchair.

However, such auxiliary traction devices, which are configured to be associated at the front of a wheelchair, are known to be little effective when moving uphill, as the auxiliary traction device/wheelchair assembly remains almost unloaded, to the detriment of grip on the ground.

Alternatively, as mentioned above, there are auxiliary devices configured to be associated with the wheelchair exclusively in the rear position relative to the rotation axis of the rear wheels of the wheelchair. In this case, obviously, such auxiliary traction devices do not provide a steering unit that can be actuated by the disabled person, but they comprise a motorised wheel that can be controlled by means of appropriate control devices available to the disabled, such as a joystick, or such devices act with an assisted driving rationale, i.e., when the disabled person manually operates the rear wheels of the wheelchair, this auxiliary device activates, based on the direction and speed of movement imposed by the disabled person, the rotation of the wheel of the device itself, thus facilitating the movement of the wheelchair.

However, this type of auxiliary traction devices also have an important drawback that takes place when the wheelchair is moving downhill. In fact, in such a circumstance the rear auxiliary traction device is not able to adequately brake the wheelchair, as the former is substantially dragged along by the latter.

Furthermore, with the rear positioning of the auxiliary traction device, the thrust generated by the electric motor of the latter tends to squash the front wheels of the wheelchair resting on the ground. This, disadvantageously, even in case of very small unevenness of the ground or of small steps, causes the aforementioned front wheels of the wheelchair to catch on such unevenness, preventing the wheelchair from moving forward or even causing it to tip over.

Therefore, it may be stated that, depending on the driving and ground conditions faced by a disabled person, each of the above-mentioned types of auxiliary traction devices have certain drawbacks compared to the other types.

In relation to this, a further drawback of all the above-mentioned types of auxiliary traction devices is that each of them is designed to be coupled to a wheelchair in only one specific position, and thus each of these types of wheelchairs is designed to be used in only one of the above-mentioned modes.

SUMMARY OF THE DISCLOSURE

The task of the present invention is to develop an auxiliary traction device capable of obviating the aforementioned drawbacks and limitations of the prior art.

In particular, one object of the invention is to develop a universal-type auxiliary traction device, i.e., one that can be configured, depending on the driving condition that a disabled person faces, so as to be coupled to a manual wheelchair, alternatively at the front, at the rear or even in a central position relative to the rotation axis of the rear wheels of the aforesaid wheelchair.

Furthermore, it is the object of the invention to create an auxiliary traction device that can be manually controlled by a disabled person, or alternatively, that can make it possible to implement an assisted wheelchair guide.

Another object of the invention is to create an auxiliary traction device that can be configured in a simple and intuitive manner in order to alternate its use as described above.

The task as well as the objects mentioned above are achieved by an auxiliary traction device according to the claims.

Further features of the auxiliary traction device are described in the respective dependent claims.

An auxiliary traction system comprising an auxiliary traction device of the invention associated with a specific accessory device, among a plurality of accessory devices, so as to configure the aforesaid auxiliary traction device to one of the aforementioned types of use, is also part of the invention.

The features of the auxiliary traction system of the invention are described in the claims.

The method for fastening the traction device of the invention to a wheelchair, according to the claims, is also part of the invention.

BRIEF DESCRIPTION OF THE DRAWINGS

The task and the above-mentioned objects, together with the advantages that will be mentioned hereinafter, are highlighted by the description of a preferred embodiment of the auxiliary traction device of the invention and, likewise, in three embodiments of auxiliary traction systems of the invention, which are given, for exemplary and non-limiting purposes, with reference to the accompanying drawings, wherein.

DETAILED DESCRIPTION OF THE PREFERRED EMBODIMENTS

The auxiliary traction device for wheelchairs of the invention is shown in an isolated form in FIGS. 1 to 7, where it is globally referred to as 1.

As it can be seen in the aforesaid figures, the aforesaid auxiliary traction device 1 comprises a support structure 2 to which a drive wheel 3 is rotatably coupled, so as to define a rotation axis X of the latter.

Figure 1:
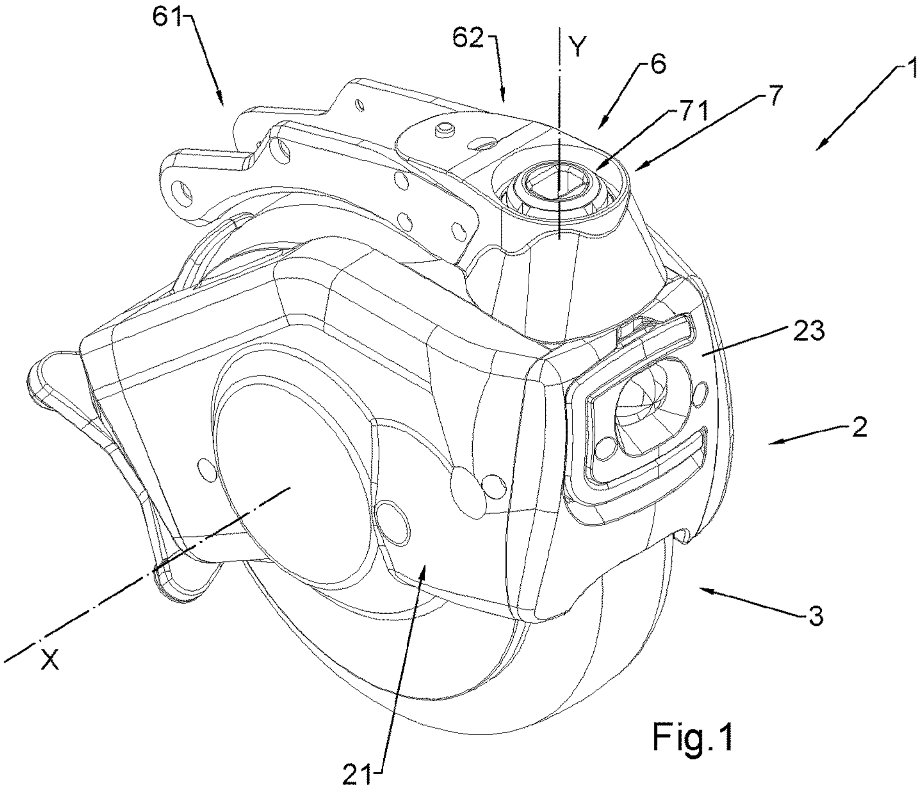
FIG. 1 shows the auxiliary traction device of the invention according to a first axonometric view.
Figure 2:
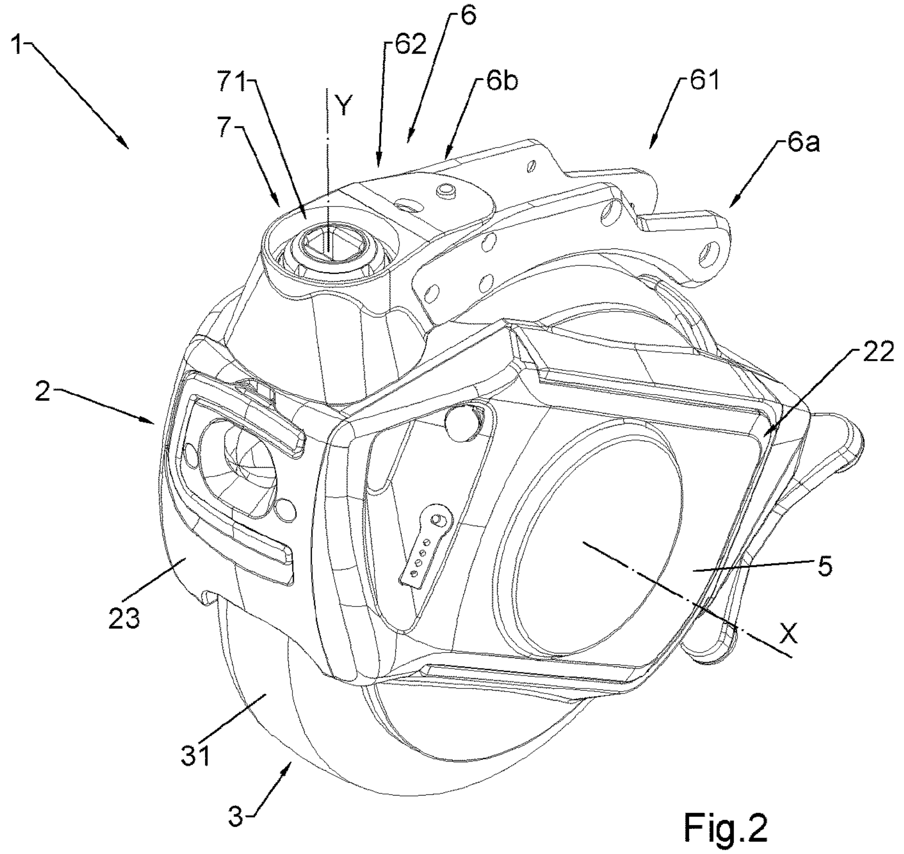
FIG. 2 shows the auxiliary traction device of the invention according to a second axonometric view.
Figure 3:
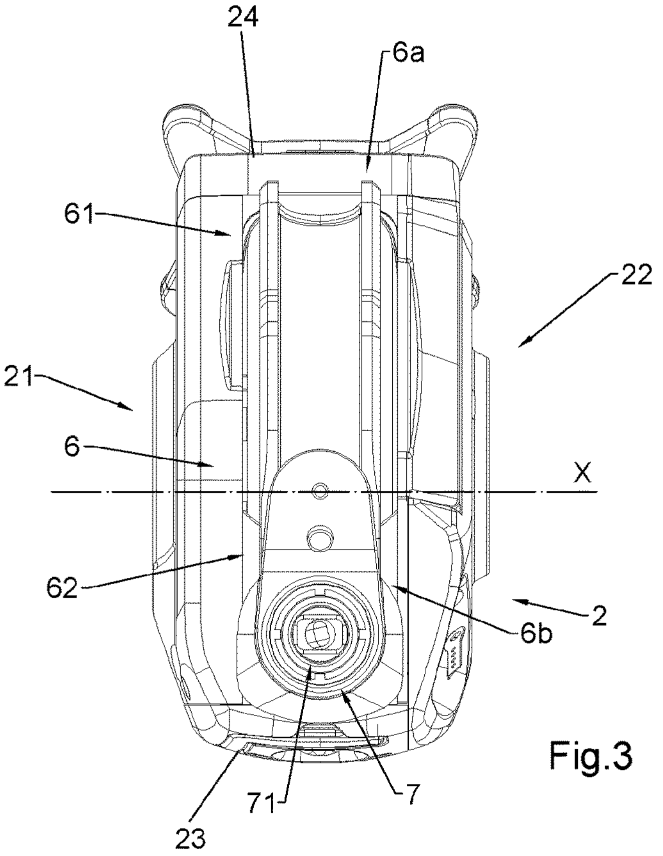
FIG. 3 shows the auxiliary traction device of the invention as seen from above.

As it can be seen in FIGS. 1 to 3, according to the preferred embodiment of the invention, such a support structure 2 has two side portions 21 and 22, arranged on opposite sides of the drive wheel 3 so as to define said rotation axis X, connected to each other by a front wall 23 and a rear wall 24.

Obviously, the auxiliary traction device 1 also comprises the aforementioned drive wheel 3, which in turn is provided with a wheel 31 operatively connected to an electric motor 32, arranged at the hub of such wheel 31.

Figure 6:
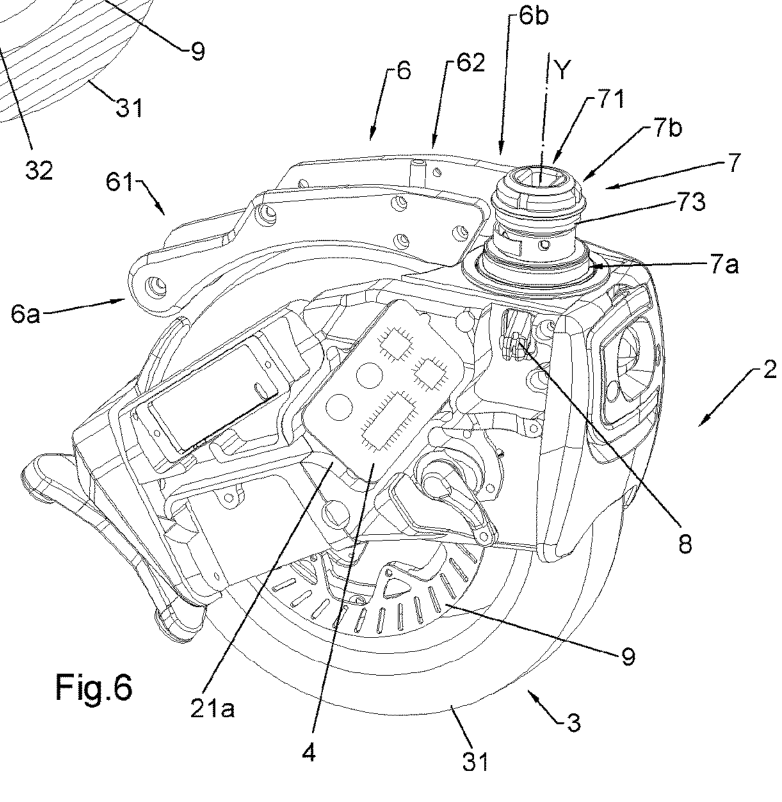
FIG. 6 shows the auxiliary traction device of the invention according to a first exploded side view.

The auxiliary traction device 1 of the invention further comprises an electronic control unit 4 configured to control the rotation of the aforesaid electric motor 32. Preferably, such an electronic control unit 4 is arranged inside a housing 21*a*, defined in a first side portion 21 of the aforesaid two side portions 21 and 22 of the support structure 2, as shown in FIG. 6.

Figure 7:
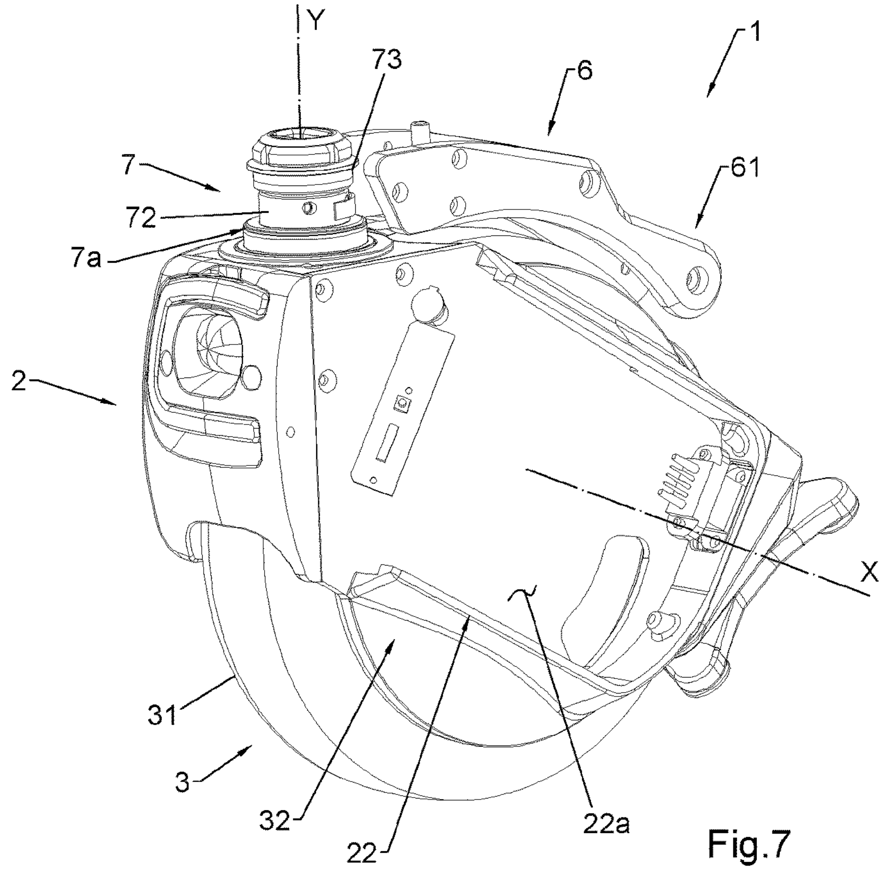
FIG. 7 shows the auxiliary traction device of the invention according to a second exploded side view.
Figure 8:
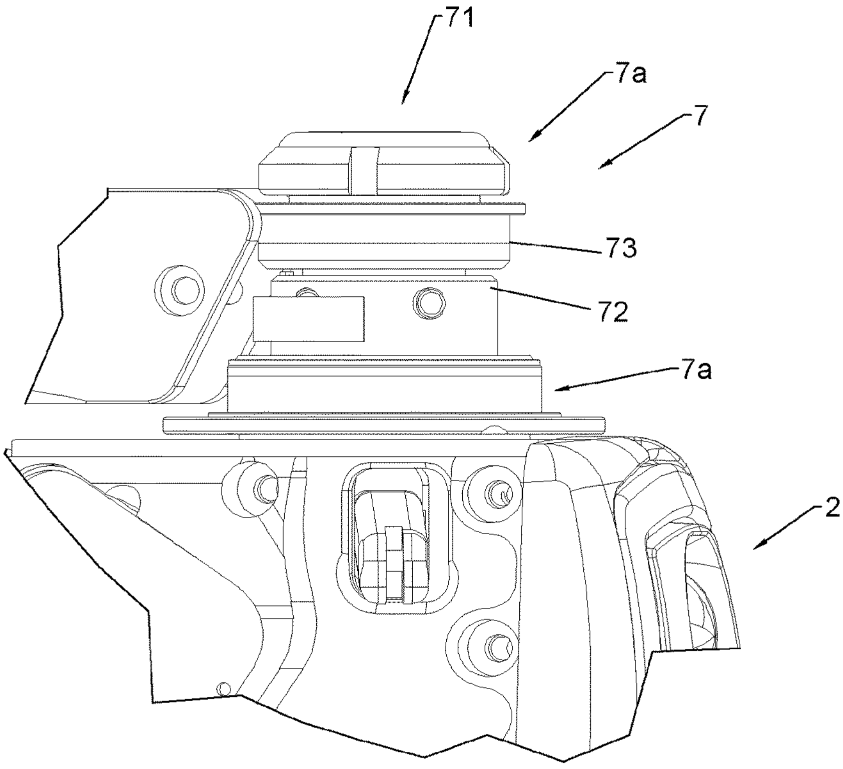
FIG. 8 shows a detail of the auxiliary traction device of the invention according to a first exploded side view.

In addition, the auxiliary traction device 1 is provided with electrical energy storage means 5, in particular a rechargeable battery-pack, configured to power the drive wheel 3 and the electronic control unit 4. According to the preferred embodiment of the invention, such electrical energy storage means 5 are coupled and arranged inside a second housing 22*a*, defined at the other side portion 22, relative to the first housing 21*a*, as shown in FIG. 7.

Advantageously, the fact that the electronic control unit 4 and the electrical energy storage means 5 are arranged respectively at housings 21*a* and 22*a* defined in the side portions 21 and 22 of the support structure 2 makes it possible to make the auxiliary traction device 1 of the invention extremely compact. This feature, together with further features described hereinafter, makes it possible to fasten the auxiliary traction device 1 of the invention alternatively in different positions relative to the wheelchair W, in particular at the front or rear of the latter or, alternatively, at the rotation axis X2 of the rear wheels RP of the same wheelchair W. Consequently, this advantageously makes it possible to use the same auxiliary traction device 1 of the invention in different alternative modes:

1. driving with the auxiliary traction device 1 mounted at the front and guided by pushing on the wheels of the wheelchair, so as to implement an assisted driving;
2. driving with the auxiliary traction device 1 guided by a handlebar accessory;
3. outdoor driving with the auxiliary traction device 1 mounted at the front and guided by a power-assisted steering device controlled by a joystick (typical driving for tetraplegic users);

4. driving with the auxiliary traction device 1 mounted at the rear and guided by pushing on the wheels of the wheelchair, so as to implement an assisted driving;
5. indoor driving with the auxiliary traction device 1 mounted at the rear and guided by a power-assisted steering device controlled by a joystick (typical driving for tetraplegic users);
6. driving with the auxiliary traction device 1 mounted at the centre and guided by pushing on the wheels of the wheelchair, so as to implement an assisted driving.

None of the traction systems of the prior art is capable of being alternatively configured according to the aforementioned six modes.

The auxiliary traction device 1 is also provided with a connection assembly 6 which is rotatably associated with the support structure 2 so as to define a steering axis Y of the same support structure 2, together with the drive wheel 3, relative to this connection unit 6. In particular, as it can be seen in FIG. 5, such a steering axis Y is defined as orthogonal and offset from the rotation axis X of the drive wheel 3.

Furthermore, such a rotatable association between the connection assembly 6 and the support structure 2 is a free-type rotatable association.

The term "free-type rotatable association" in this context means that the connection assembly 6 is free to rotate about the support structure 2 substantially without any constraints.

More in detail, such a free-type rotatable association between the connection assembly 6 and the support structure 2 allows the same connection assembly 6 to rotate substantially by an angle of 360° relative to said support structure 2.

Figure 4:
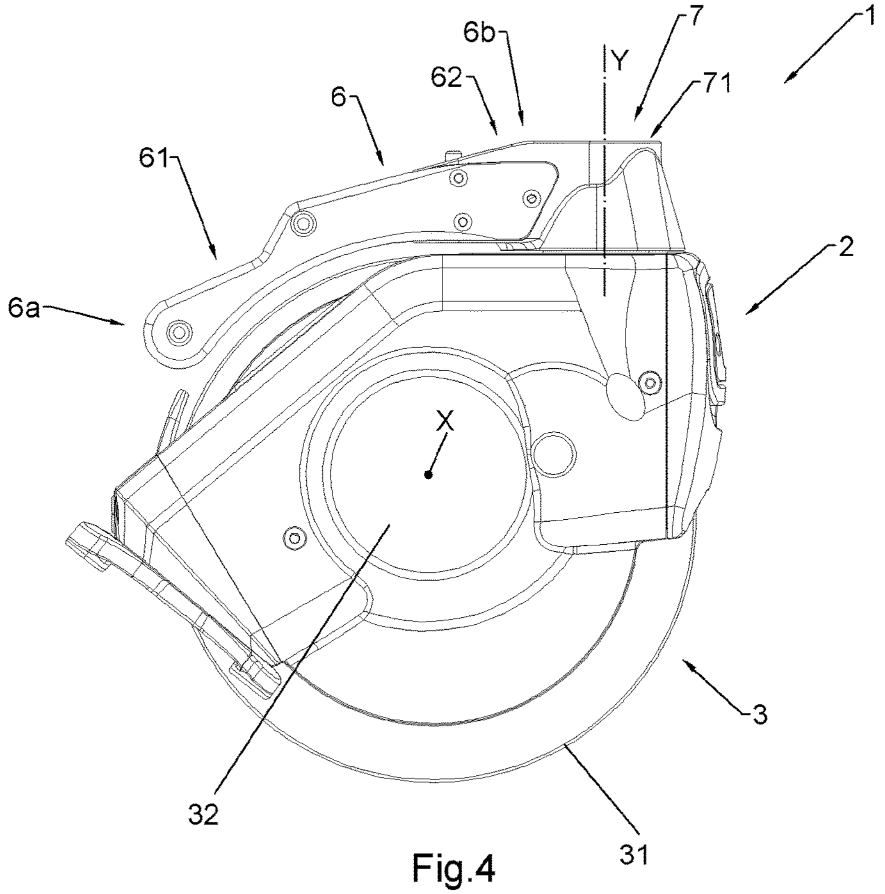
FIG. 4 shows the auxiliary traction device of the invention according to a first side view.

As shown for example in FIG. 4, this connection assembly 6 comprises first fastening means 61 for connecting the auxiliary traction device 1 to the frame T of a wheelchair W.

Figure 9:
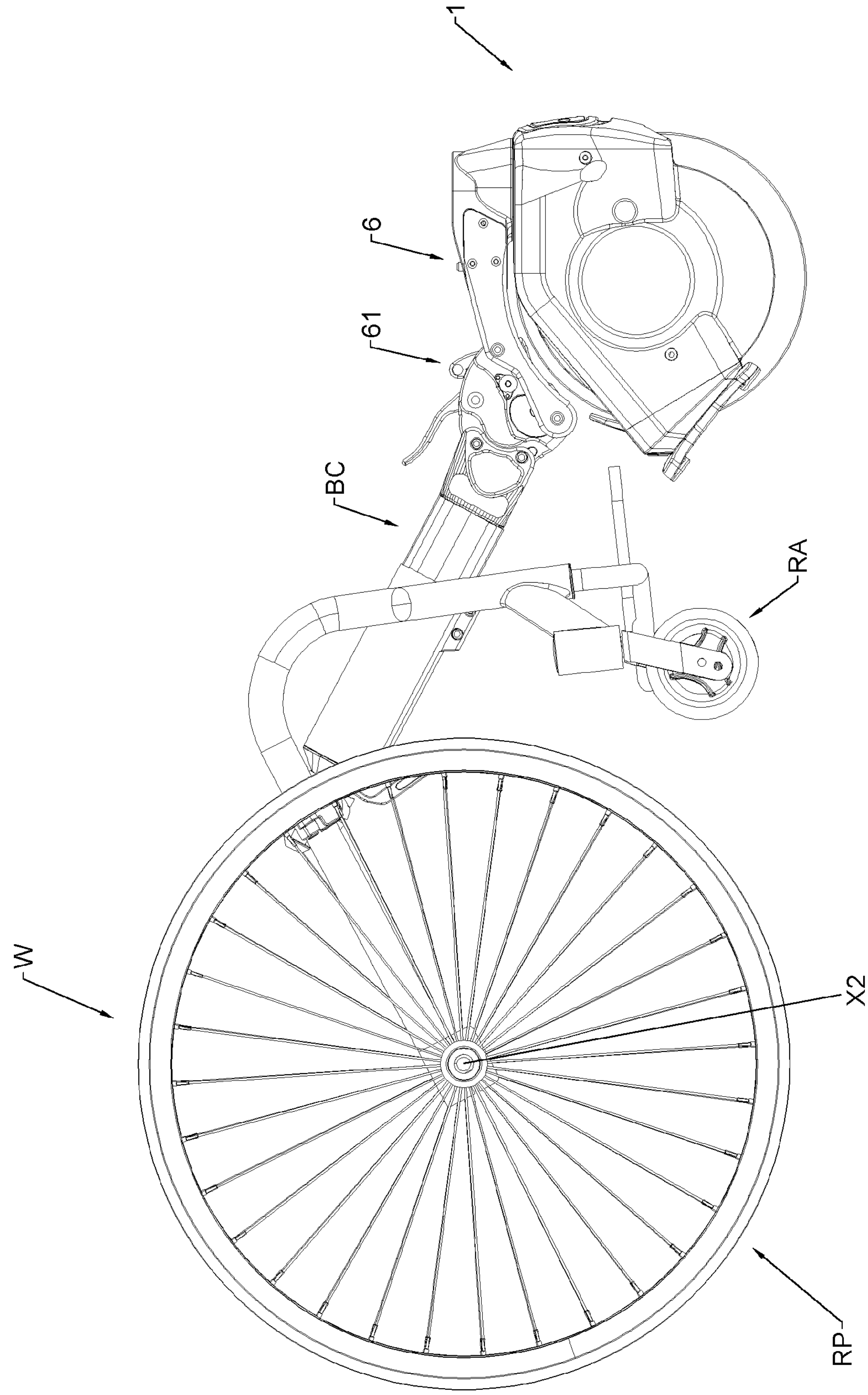
FIG. 9 shows a first embodiment of the auxiliary traction system of the invention.
Figure 10:
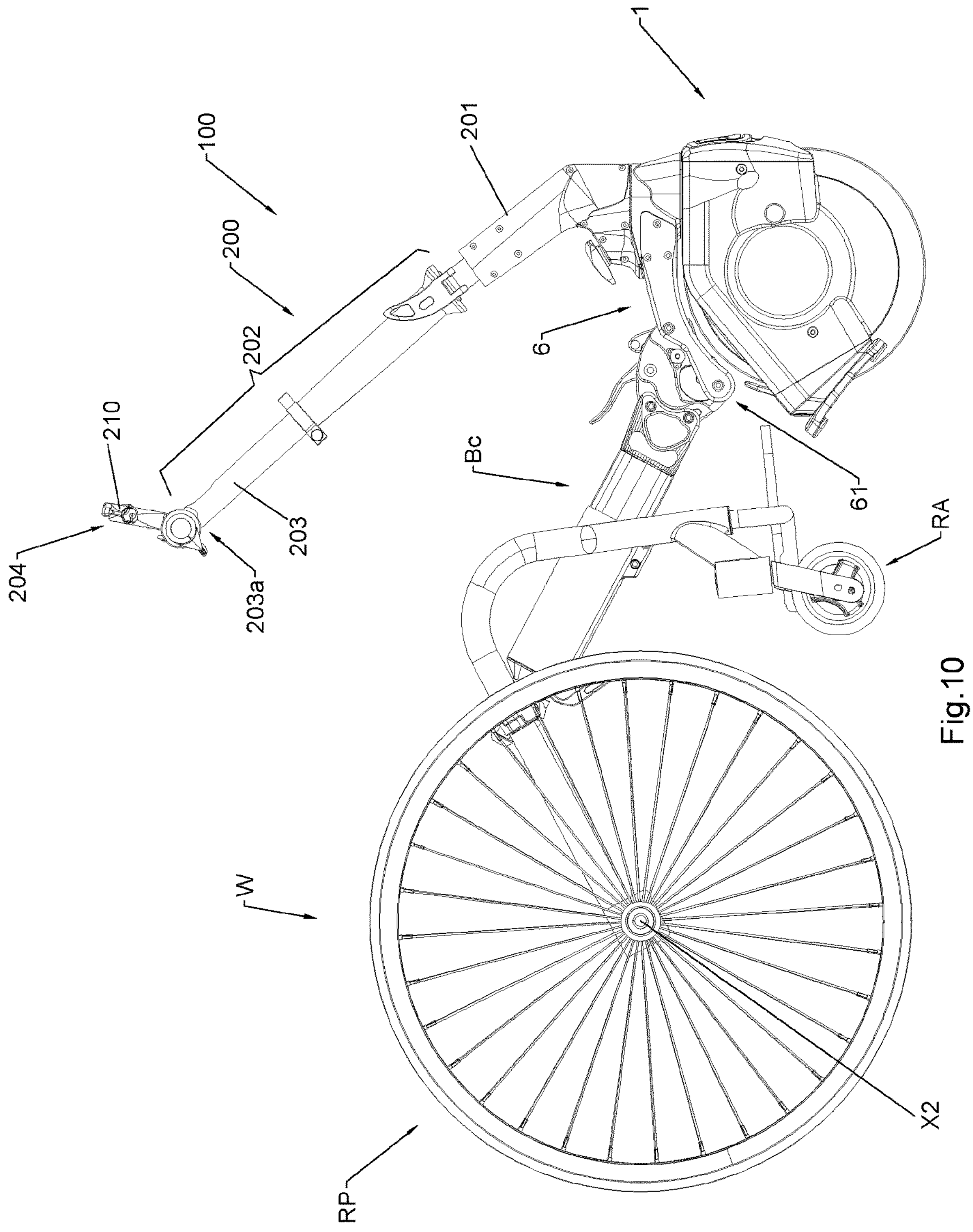
FIG. 10 shows a second embodiment of the auxiliary traction system of the invention.
Figure 12:
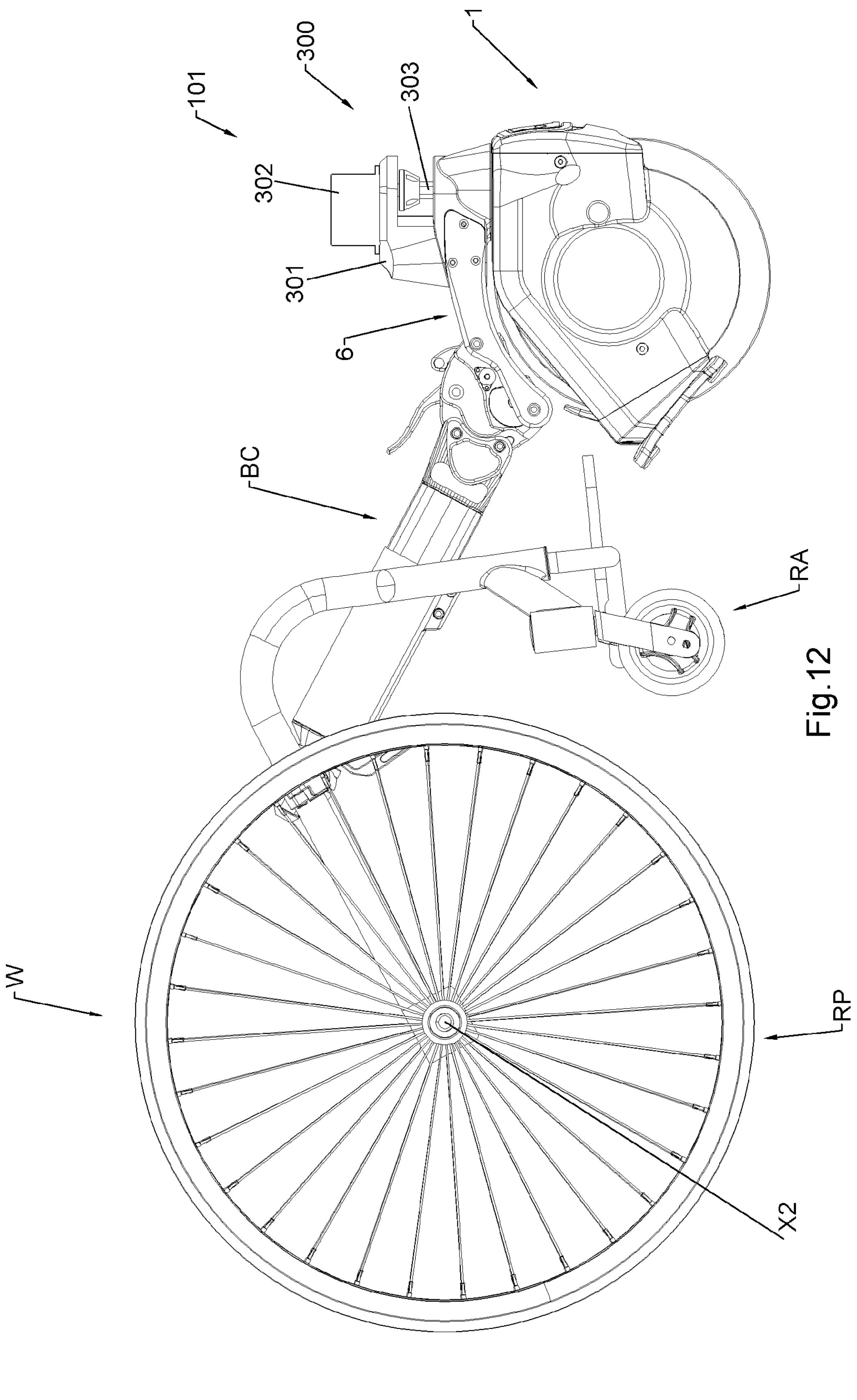
FIG. 12 shows a third embodiment of the auxiliary traction system of the invention mounted at the front of a wheelchair.

In particular, such first fastening means 61, when the connection assembly 6 is rotated to a position substantially aligned with the support structure 2, are configured to fasten the auxiliary traction device 1 at the front of the rotation axis X2 of the rear wheels RP of the wheelchair W by means of a connection arm BC, so as to keep the front wheels RA of the same wheelchair W raised, as shown, for example, in FIGS. 9, 10 and 12.

Figure 14:
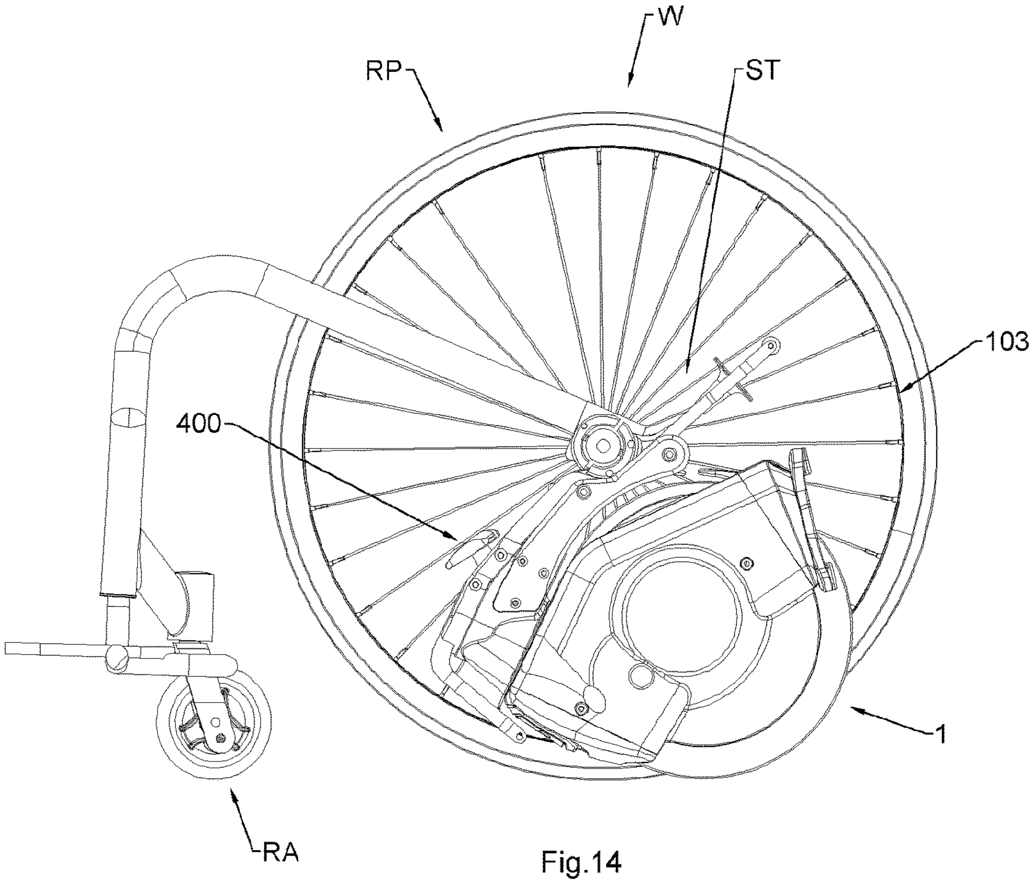
FIG. 14 shows a fourth embodiment of the auxiliary traction system of the invention.

Furthermore, such first fastening means 61, still when the connection assembly 6 is rotated to a position substantially aligned with the support structure 2, are configured to fasten the auxiliary traction device 1, by interposing a bracketing system ST, at the rotation axis X2 of the rear wheels RP of the wheelchair W, as represented in FIG. 14.

Figure 13:
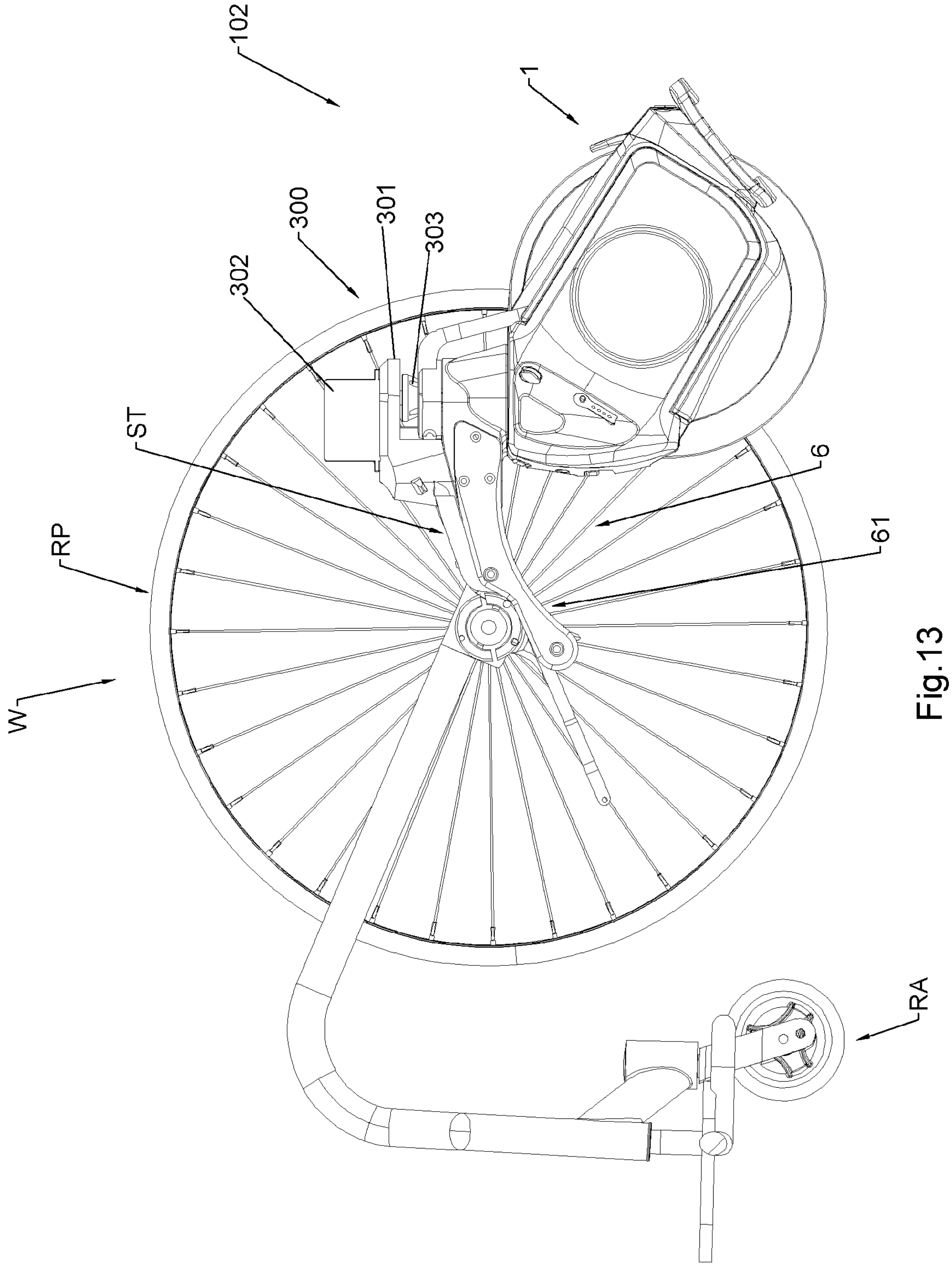
FIG. 13 shows the third embodiment of the auxiliary traction system of the invention mounted at the rear of a wheelchair.

Moreover, said first fastening means 61, when said connection assembly 6 is rotated substantially by 180° relative to the support structure 2, are configured, by interposing an appropriate bracketing system ST, to fasten the auxiliary traction device 1 at the rear of the rotation axis X2 of the rear wheels RP of the wheelchair W, as shown in FIG. 13.

According to the preferred embodiment of the invention, the connection assembly 6 has an elongated profile wherein said first fastening means 61 are defined at the distal end 6*a* relative to the end 6*b* at which such connection assembly 6 is rotatably associated with the support structure 2.

This advantageously makes it possible, based on the relative orientation between the connection assembly 6 and the support structure 2, as it can be seen in FIGS. 9, 10, 12 and 13, to connect the auxiliary traction device 1 of the invention both at the front, at the rear, and, also, in a substantially aligned position relative to the rotation axis X2 of the rear wheels RP of the wheelchair W, as visible in FIG. 14.

In particular, according to the preferred embodiment of the invention, the elongated profile of the connection assembly 6 is a curvilinear profile with an angle of curvature substantially corresponding to the angle of curvature of said wheel 31, so that when said connection assembly 6 is arranged in a position substantially aligned with said support structure 2, its profile follows a portion of the profile of the same wheel 31, as visible in FIG. 4.

According to the invention, the auxiliary traction device 1 further comprises a hooking body 7 defined coaxially to the steering axis Y, rotatably coupled to the connection assembly 6 and integrally connected with a first end 7*a* thereof to the support structure 2. The hooking body 7 is further provided, at the second end 7*b*, opposite to the aforementioned first end 7*a*, with a hooking shaping 71, so as to allow to operatively hook an external accessory device 200, 300, 400, some types of which are better defined hereinafter, and is in turn provided with a counter-shaping complementary to the hooking shaping 71.

This particular feature makes it possible to quickly and easily couple any one of the above-mentioned external accessory devices 200, 300, 400 to the auxiliary traction device 1.

As will be described in detail hereinafter, this feature makes it possible to use the auxiliary traction device 1 of the invention in combination with appropriate and different external accessory devices 200, 300, 400, and hooked to the wheelchair W in different positions.

Preferably, said hooking body 7, as observed in FIGS. 5 to 8, comprises a cylindrical hooking body 72, integrally connected with the first end 7*a* to the support structure 2, so that the same cylindrical hooking body 72 is coaxial to the steering axis Y. Its cylindrical shaping makes it possible to implement the rotatable coupling with the connection assembly 6 by interposing at least one mechanical bearing 73.

Figure 5:
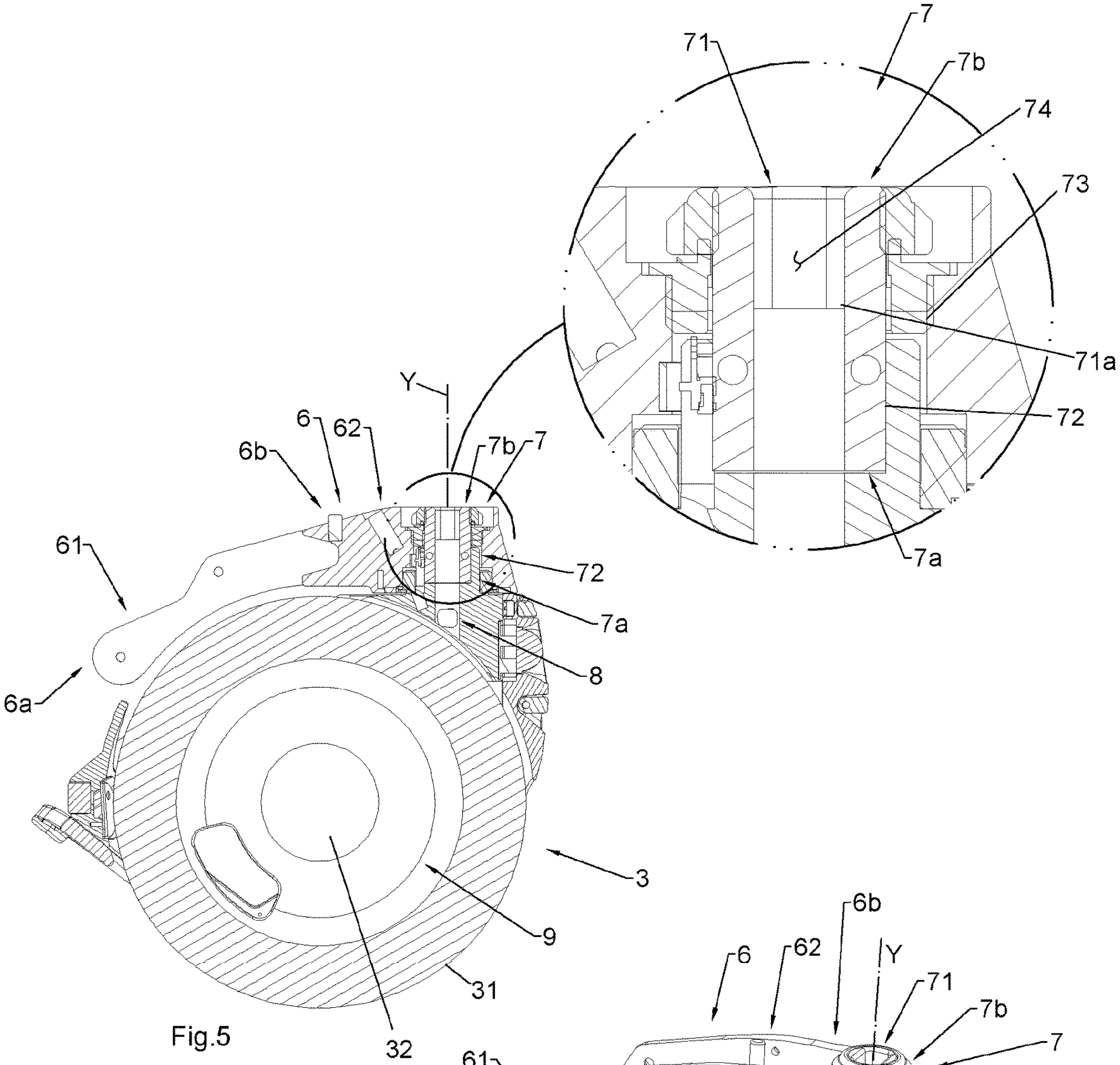
FIG. 5 shows the auxiliary traction device of the invention according to a first side view sectioned according to a vertical section plane.

According to the preferred embodiment of the invention, such a cylindrical hooking body 72 is substantially inserted into said connection assembly 6, as it can be seen for example in FIG. 5.

This further contributes to determining the utmost compactness of the auxiliary traction device 1 of the invention, in order to be able to combine it with the wheelchair W in the different configurations described above.

On the other hand, regarding the hooking shaping 71, it preferably has a recessed polygonal profile, even more preferably a recessed rectangular profile.

Furthermore, still according to the preferred embodiment of the invention, the aforesaid cylindrical hooking body 72, as it can still be observed in FIG. 5, has a through-hole 74 defined axially from the bottom 71*a* of the hooking shaping 71, to the first end 7*a*.

Furthermore, it is envisaged, according to this preferred embodiment, that the support structure 2 is provided, below the first end 7*a* of the cylindrical hooking body 72, and thus adjacent to the aforesaid through-hole 74, with a leverage assembly 8, configured to actuate a braking system 9 associated with the wheel 31.

This set of features therefore makes it possible to engage this leverage assembly 8, and thus to actuate the braking system 9 of the wheel 31, by intervening through the aforementioned through-hole 74.

The technical advantage of such a configuration will be clarified hereinafter during the description of one of the preferred embodiments of the auxiliary traction system 1 of the invention.

Finally, according to the preferred embodiment of the invention, the connection assembly 6 also comprises second fastening means 62 for the removable-type integral fastening of the auxiliary traction device 1 with one of the aforementioned external accessory devices 200, 300, 400.

Before describing the various embodiments of the auxiliary traction system 100, 101, 102 and 103, it is important to reiterate that the auxiliary traction device 1 of the invention makes it possible to obtain an important technical advantage over the auxiliary traction devices of the known-type, in that, since the same auxiliary traction device 1 of the invention is provided with the aforementioned hooking body 7, it can be coupled at different positions relative to the wheelchair W and can be used in different ways. In particular, as already mentioned above, the auxiliary traction device 1 may be used in isolation or may be associated at said hooking body 7 with different types of external accessory devices 200, 300, 400.

More in detail, according to a first mode of use, the auxiliary traction device 1, in an isolated manner, may be associated at the front with the rotation axis X2 of the rear wheels RP of a wheelchair W, with the support structure 2 and the drive wheel 3 freely pivoting relative to the connection assembly 6, as shown in FIG. 9.

Such an auxiliary traction device 1 is thereby configured to operate in the assisted driving mode, i.e., the electronic control unit 4, by means of appropriate sensors, is configured to detect the speed and direction of movement imposed in manual mode on the rear wheels RP and, based on these readings, this electronic control unit 4 is configured to impose a rotation of a predetermined magnitude on the drive wheel 3.

Alternatively, a second mode of use of the auxiliary traction device 1 provides to associate to the latter an accessory device defining a manual steering device 200, so as to define a first embodiment of the auxiliary traction system 100 of the invention, as shown in FIG. 10.

In particular, such a manual steering device 200 comprises a tubular column 201 and a steering unit 202 provided with a steering tube 203 rotatably inserted into said tubular column 201. As it can be seen in FIG. 10, the steering tube 203 is provided, at one first end 203*a* thereof, with a handlebar 204 and, as it can be seen in FIG. 11, at the second end 203*b*, opposite to said first end 203*a*, with a counter-shaping 205, which is complementary to the hooking shaping 71 of the coupling assembly 7. Furthermore, the tubular column 201 is provided with fastening means 206, which are compatible with the second fastening means 62 of the coupling assembly 7.

Such an association between the auxiliary traction device 1 and the aforesaid manual steering device 200 provides, in particular, to operatively couple the hooking shaping 71 to the counter-shaping 205, so that the handlebar 204 is operatively cooperating with the support structure 2 and, in particular, with the drive wheel 3. In other words, this operative cooperation allows to steer the motor wheel 3 by rotating the aforementioned handlebar 204.

Furthermore, such an association between the auxiliary traction device 1 and the aforesaid manual steering device 200 provides to fasten the fastening means 206 of the same manual steering device 200 with the second fastening means 62 of the coupling assembly 7, so as to make the two aforesaid devices integral.

Figure 11:
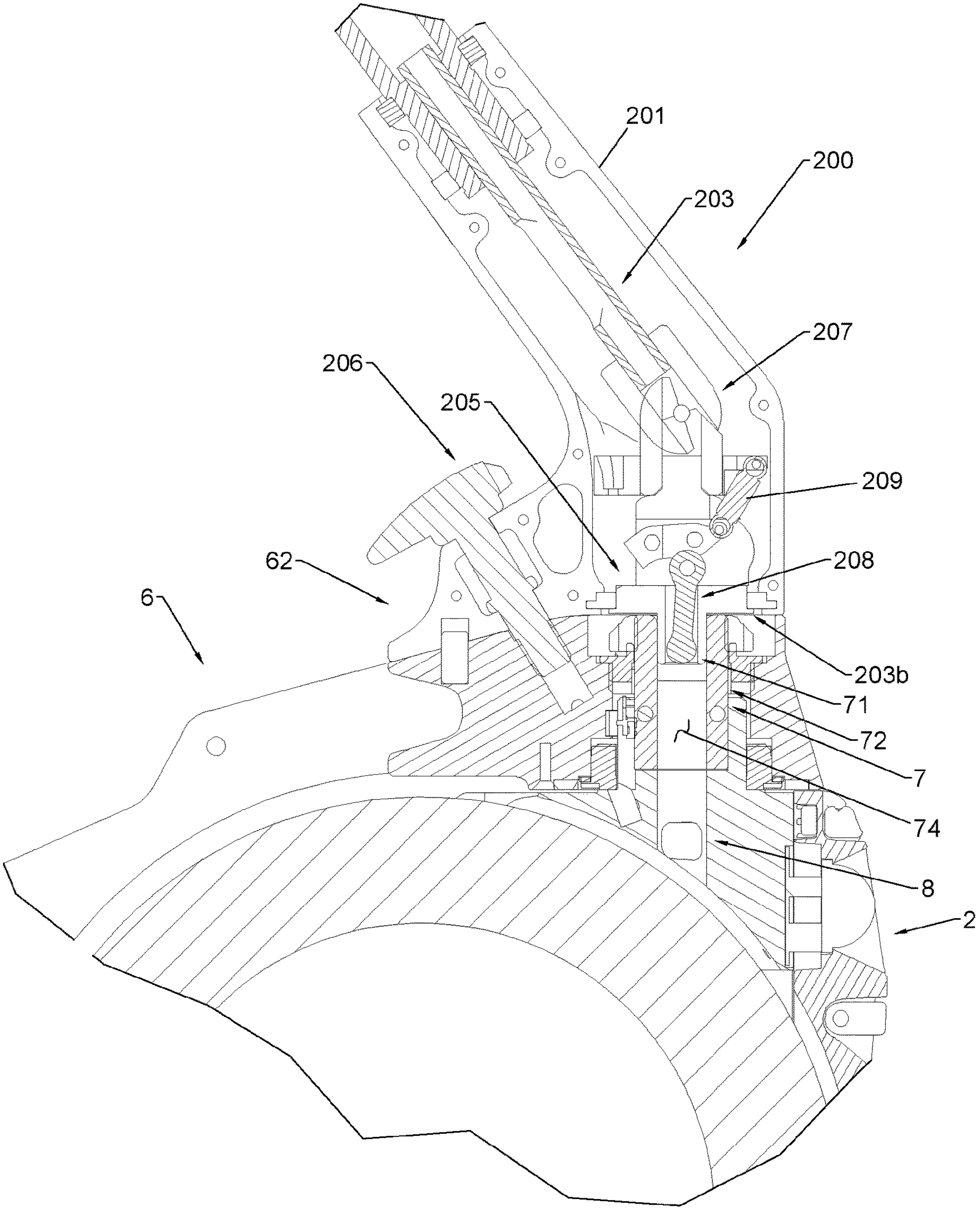
FIG. 11 shows a detail of the auxiliary traction system of FIG. 10.

According to the preferred embodiment of the invention, as it can be seen in FIG. 11, the manual steering device 200 comprises a cardan joint 207, interposed between the steering tube 203 and the counter-shaping 205.

This feature advantageously makes it possible to steer the drive wheel 3 while limiting the rotation from the handlebar 204, thus avoiding the "helm" effect of the handlebar 204 itself.

Still preferably, the counter-shaping 205 of the manual steering device 200 comprises a through-hole 208 placed in communication with the through-hole 74 of the cylindrical body 72.

Furthermore, according to this preferred embodiment, the manual steering device 200 is provided with a leverage system 209 connected at the handlebar 204 to a manoeuvring lever 210, configured to be actuated by a user, and at the opposite end, said leverage system 209 being arranged passing through the through-hole 208 of the counter-shaping 205 and through said through-hole 74 of the cylindrical body 72 of the auxiliary traction device 1.

Thus, the leverage system 209 is configured to engage the leverage assembly 8 of the auxiliary traction device 1, when the manoeuvring lever 209 is actuated, in such a way as to activate the braking system 9.

This makes it possible to create an emergency braking system on the auxiliary traction device 1 of the invention, which may be controlled from the handlebar 204 of the manual steering device 200, and at the same time to obtain the quick and easy connection and disconnection of the same manual steering device 200 from the auxiliary traction device 1 of the invention.

In general, therefore, it is possible to implement, by means of the auxiliary traction device 1 of the invention, a manually guided auxiliary traction system 100 by means of a handlebar 204, wherein the handlebar is provided with an acceleration system capable of controlling the rotation of the drive wheel 3.

Figure 12A:
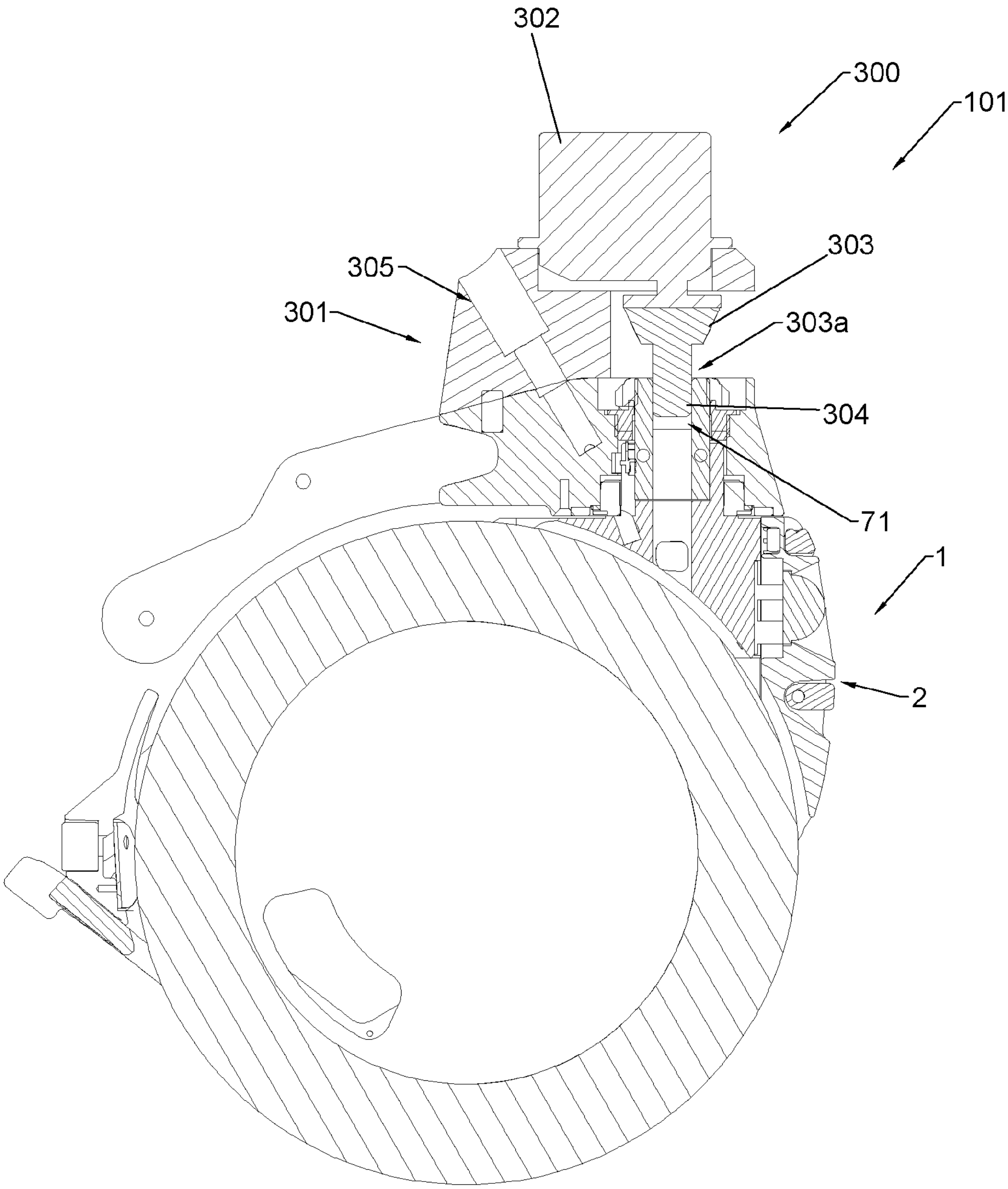
FIG. 12*a* shows a detail of the auxiliary traction system of FIG. 12.

According to variant embodiments of the invention, the auxiliary traction systems 101 and 102, respectively shown in FIG. 12 and FIG. 13, comprise, as an accessory device, a power-assisted steering device 300, comprising in turn a support housing 301 wherein an electric steering motor 302 is inserted. In particular, as it can be seen in the detail of FIG. 12*a* relating to the auxiliary traction system 101, this electric steering motor 302 is provided with a rotation shaft 303 provided, at its free end 303*a*, with a counter-shaping 304.

According to the invention, this counter-shaping 304 is coupled to the hooking shaping 71 in such a way as to have the rotation shaft 303 operatively cooperate with the support structure 2 and the drive wheel 3. Furthermore, the support casing 301 is provided with fastening means 305 so as to make the power-assisted steering device 300 integral with the auxiliary traction device 1.

Furthermore, the auxiliary traction system 101 and 102, according to the present preferred embodiment, comprises a satellite control device, not shown in the figures, configured such that the user can control the movement of the electric steering motor 302, as well as to control the rotation speed and braking of the drive wheel 3.

It is thereby possible to implement, by means of the auxiliary traction device 1 of the invention, an auxiliary traction system with power-assisted steering with front traction, as in the case of the auxiliary traction system 101 of FIG. 12, or rear traction, as in the case of the auxiliary traction system 102 of FIG. 13.

Figure 14A:
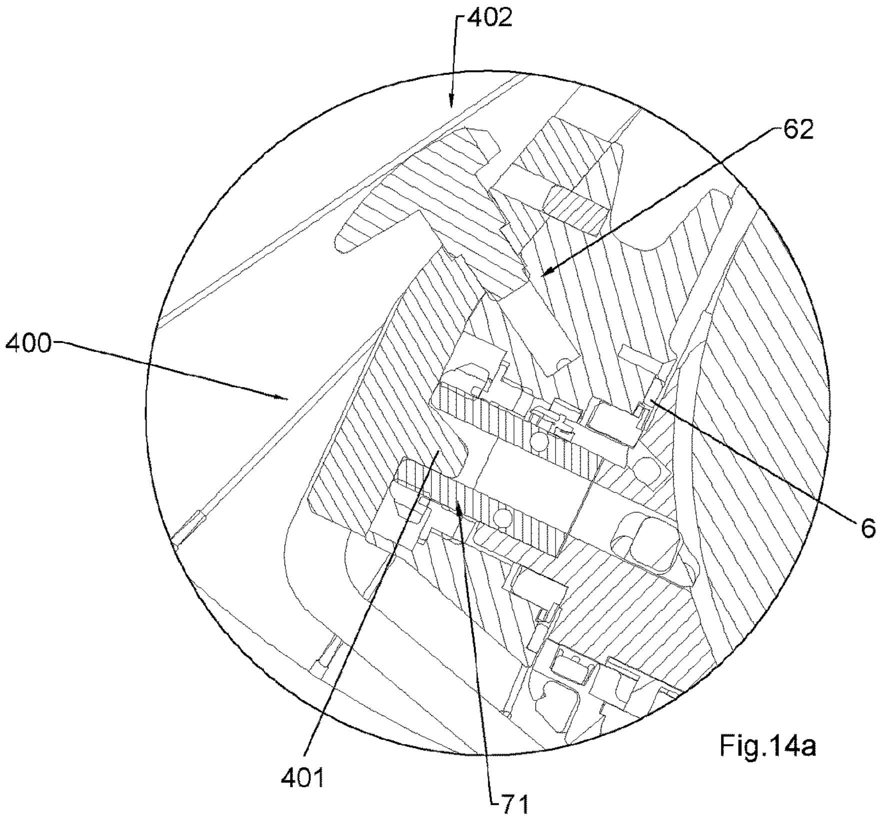
FIG. 14*a* shows a sectional detail of the auxiliary traction system of FIG. 14.

Furthermore, a different embodiment of the auxiliary traction system of the invention, referred to as 103 in FIG. 14, provides that the accessory device is a clamping bracket 400 wherein a counter-shaping 401 and fastening means 402 are integrally defined, as it can be seen in the detail of FIG. 14*a*.

In particular, this counter-shaping 401 and the hooking shaping 71 of the auxiliary traction device 1 are coupled to each other and, likewise, the fastening means 402 are fastened to the second fastening means 62, in such a way as to prevent the rotation of the support structure 2 and the drive wheel 3 relative to the connection assembly 6.

According to this embodiment of the auxiliary traction system 103, the auxiliary traction device 1 is fastened at the rotation axis X2 of the rear wheels RP of the wheelchair W and the auxiliary traction system 103 of the invention is controlled by means of a satellite control device, such as a joystick, operatively connected, preferably in a wireless mode, with the electronic control unit 4, so as to allow the disabled person to control the speed and braking of the wheelchair 3.

As mentioned above, the method of fastening the auxiliary traction device 1 to a wheelchair W is also part of the invention.

In particular, the method of the invention alternatively provides three fastening configurations, described hereinafter.

In particular, it should be pointed out that all the three configurations shortly described may be implemented with the same auxiliary traction device 1 of the invention.

A first fastening configuration provides to fasten the auxiliary traction device 1 at the front of the rotation axis X2 of the rear wheels RP of the wheelchair W.

To this end, the first configuration provides to perform the following steps:

- rotating the connection assembly 6 into a position substantially aligned with the support structure 2, as visible e.g. in FIG. 9;
- arranging the auxiliary traction device 1 at the front of the wheelchair W;
- fastening, by means of the first hooking means 61 and a connection arm BC, the auxiliary traction device 1 to the rotation axis X2 of the rear wheels RP of the wheelchair W, so as to keep the front wheels RA of the wheelchair W raised, as shown in FIG. 9.

This first configuration, as already described and reiterated shortly, makes it possible to use the traction device 1 in three modes: either controlled by a manual steering device 200 provided with an accelerator, or by a satellite control system, such as a joystick, or without any further accessories, as an assisted driving system.

In the first case, in fact, the method of the invention, regarding the first configuration, provides to fasten said manual steering device 200 to the auxiliary traction device 1 where, as seen above, the manual steering device 200 comprises a tubular column 201 and a steering unit 202 provided with a steering tube 203 rotatably inserted into the tubular column 201. Furthermore, the steering tube 203 is provided at one first end 203*a* thereof with a handlebar 204 and at the second end 203*b*, opposite to said first end 203*a*, with a coupling counter-shaping 205 complementary to the hooking shaping 71 of said hooking body 7. In addition, the tubular column 201 is provided with fastening means 206 compatible with the second fastening means 62 of the connection assembly 6.

Thus, the fastening of such a manual steering device 200 with the auxiliary traction device 1 provides to couple the counter-shaping 205 and the shaping 71 so as to have the handlebar 204 operatively cooperate with the support structure 2 and with the drive wheel 3, and to fasten the fastening means 206 with the second fastening means 62 in such a way as to make the auxiliary traction device 1 integral with the manual steering device 200.

In the second case, the first fastening configuration further provides to fasten a power-assisted steering device 300 to the traction device 1, where, as already mentioned above, the power-assisted steering device 300 comprises a support casing 301 wherein an electric steering motor 302 provided with a rotation shaft 303 is inserted. The rotating shaft 303 is provided, at a free end 303*a* thereof, with the counter-shaping 304 complementary to the hooking shaping 71 of the hooking body 7. The support casing 301 is provided with fastening means 305 compatible with the second fastening means 62 of the connection assembly 6.

Thus, the fastening of the power-assisted steering device 300 with the auxiliary traction device 1 provides to couple the counter-shaping 304 to the shaping 71 so as to have the rotation shaft 303 operatively cooperate with the support structure 2 and with the drive wheel 3, and provides to fasten the fastening means 305 with the second fastening means 62 so as to make the auxiliary traction device 1 integral with the power-assisted steering device 300.

As mentioned above, this first configuration, which provides to use the power-assisted steering device 300, also provides to associate a satellite control device with the power-assisted steering device 300 and the auxiliary traction device 1. This control device is in fact configured such that a user can control the movement of the electric steering motor 302 and the movement of the drive wheel 3.

Turning now to the description of the second fastening configuration, as an alternative to the first one, it provides to fasten the auxiliary traction device 1 at the rotation axis X2 of the rear wheels RP of the wheelchair W.

To enable the implementation of the second configuration, it is provided to:

- rotate the connection assembly 6 to a position substantially aligned with the support structure 2;
- arrange the auxiliary traction device 1 below the rotation axis X2;
- fasten the auxiliary traction device 1, by interposing a bracketing system ST, at the rotation axis X2 of the rear wheels RP of the wheelchair W, as visible in FIG. 14.

This second configuration, preferably, also provides to fasten the clamping bracket 400 to the traction device 1, where, as seen above, in the clamping bracket 400 the counter-shaping 401 complementary to the hooking shaping 71 of the hooking body 7 is integrally defined. Fastening means 402 compatible with the second fastening means 62 of the connection group 6 are also provided.

Thus, the fastening between the clamping bracket 400 and the auxiliary traction device 1 provides to couple the counter-shaping 401 and the hooking shaping 71 and to fasten the fastening means 402 to the second fastening means 62 so as to prevent the rotation of the support structure 2 and the drive wheel 3 relative to the connection assembly 6.

Finally, the third configuration for fastening the auxiliary traction device 1, as an alternative to the first and second configuration, provides to fasten this auxiliary traction device 1 at the rear of the rotation axis X2 of the rear wheels RP of the wheelchair W. To allow this, as visible in FIG. 13, the third configuration provides to:

- rotate the connection assembly 6 substantially by 180° relative to the support structure 2;
- arrange the auxiliary traction device 1 at the rear of the rotation axis X2;
- fasten the auxiliary traction device 1, by interposing a bracketing system ST, at the rear of the rotation axis X2 of the rear wheels RP of the wheelchair W.

This third configuration, as already described and reiterated shortly, makes it possible to use the auxiliary traction device 1 in two modes: either via a satellite control system, such as a joystick, or without any additional accessories, as an assisted driving system.

In the first case, the third configuration of the method provides to fasten also the power-assisted steering device 300 to the auxiliary traction device 1. As seen above, the power-assisted steering device 300 comprises a support casing 301 wherein an electrical steering motor 302 provided with a rotation shaft 303 is inserted. The rotating shaft 303 is provided, at a free end 303*a* thereof, with the counter-shaping 304 complementary to the hooking shaping 71 of the hooking body 7. Furthermore, the support casing 301 is provided with fastening means 305 compatible with the second fastening means 62 of the connection assembly 6. Thus, the fastening of the power-assisted steering device 300 to the auxiliary traction device 1 provides, also for the third configuration, to couple the counter-shaping 304 to the shaping 71 so as to have the rotation shaft 303 operatively cooperate with the support structure 2 and with the drive wheel 3, and to fasten the fastening means 305 with the second fastening means 62 so as to make the auxiliary traction device 1 integral with the power-assisted steering device 300.

In this case as well, it is provided to associate a satellite control device with the power-assisted steering device 300 and the traction device 1, where the control device is configured such that the user can control the movement of the electric steering motor 302 and the movement of the drive wheel 3.

So, for what stated hitherto, the auxiliary traction device 1 achieves all the preset objects.

In particular, the object to develop a universal-type auxiliary traction device is achieved, i.e., one that can be configured, depending on the driving conditions faced by a disabled person, so as to be coupled to a manual wheelchair, alternatively at the front, at the rear or even in a central position relative to the rotation axis of the rear wheels of the aforesaid wheelchair.

Furthermore, the object to create an auxiliary traction device that can be controlled manually by a disabled person, or alternatively, that can make it possible to implement a wheelchair assisted driving, is achieved.

Another object achieved is to create an auxiliary traction device that can be configured, in order to alternate use thereof as described above, in a simple and intuitive manner.

The invention claimed is:

1. An auxiliary traction device for wheelchairs, comprising:

a support structure to which a drive wheel is rotatably coupled so as to define a rotation axis (X) of said drive wheel, said support structure having two side portions arranged on opposite sides of said drive wheel, said side portions being connected to each other by a front part and a rear part;

said drive wheel comprising a wheel operatively connected to an electric motor;

an electronic controller configured to control said electric motor, said electronic controller being arranged in a first housing defined in a first side portion of said side portions;

a battery configured to power said drive wheel and said electronic controller, said battery being arranged in a second housing defined in a second side portion of said side portions;

a connection assembly having an elongated profile and rotatably associated with said support structure at a first end thereof so as to define a steering axis (Y) of said support structure and of said drive wheel relative to said connection assembly, said steering axis (Y) being orthogonal to and offset from said rotation axis (X), said connection assembly comprising a first fastener defined in a second end of said connection assembly for selectively connecting said auxiliary traction device to a frame of a wheelchair, said connection assembly further comprising a second fastener for selectively fastening said auxiliary traction device to an external accessory device;

a hooking body being coaxially defined with said steering axis (Y), rotatably coupled to said connection assembly, and integrally connected at a first end of said hooking body to said support structure, said hooking body being provided at a second end thereof, opposite to said first end, with a hooking shaping which has a recessed polygonal profile.

2. The auxiliary traction device according to claim 1, wherein said connection assembly is rotatably connected to said support structure in a free-type association that enables said connection assembly to rotate by an angle of 360° relative to said support structure.

3. The auxiliary traction device according to claim 1, wherein said elongated profile of said connection assembly is a curvilinear profile with an angle of curvature substantially corresponding to an angle of curvature of said wheel, so that, when said connection assembly is rotated in a position substantially aligned with said support structure, said elongated profile substantially follows a portion of a profile of said wheel.

4. The auxiliary traction device according to claim 1, wherein said hooking body comprises a cylindrical hooking body integrally connected at said first end of said hooking body to said support structure so that said cylindrical hooking body is coaxial to said steering axis (Y), said cylindrical hooking body being rotatably coupled to said connection assembly by interposition of at least one mechanical bearing.

5. The auxiliary traction device according to claim 4, wherein said cylindrical hooking body is at least partially inserted into said connection assembly.

6. The auxiliary traction device according to claim 4, wherein said cylindrical hooking body has a through-hole axially defined from a bottom of said hooking shaping to said first end of said hooking body, said support structure being provided, below said first end of said hooking body, with a leverage assembly configured to actuate a braking system associated with said wheel, said leverage assembly being configured to be engaged through said through-hole.

7. The auxiliary traction device according to claim 1, wherein said first fastener, when said connection assembly is rotated in a position substantially aligned with said support structure, is configured to fasten said auxiliary traction device to a front of a rotation axis of rear wheels of said wheelchair by a connection arm so as to keep front wheels of said wheelchair raised, and is configured to fasten said auxiliary traction device, by interposing a bracketing system, at a rotation axis of said rear wheels of said wheelchair; said first fastener, when said connection assembly is substantially rotated by 180° relative to said support structure, is configured to fasten said auxiliary traction device, by interposing a bracketing system, at a rear of said rotation axis of said rear wheels of said wheelchair.

8. An auxiliary traction system comprising:

an auxiliary traction device according to claim 1;

an accessory device being provided with a counter-shaping complementary to said hooking shaping of said hooking body and with a fastener compatible with said second fastener of said connection assembly, said counter-shaping and said hooking shaping being coupled to each other so as to have said accessory device operatively cooperate with said support structure and with said drive wheel of said auxiliary traction device, said fastener being fastened to said second fastener of said connection assembly in such a way as to make said auxiliary traction device integral with said accessory device; said accessory device comprising:

a manual steering device comprising a tubular column and a steering unit provided with a steering tube rotatably inserted into said tubular column, said steering tube being provided at one first end thereof with a handlebar and at a second end opposite to said first end, of said counter-shaping, said counter-shaping and said hooking shaping being coupled to each other so as to have said handlebar operatively cooperate with said support structure and with said drive wheel, said tubular column being provided with said fastener, so as to make said auxiliary traction device integral with said manual steering device, said auxiliary traction device being fastened at a front to said rotation axis of said rear wheels of said wheelchair by a first coupler, when said connection assembly is rotated to a position substantially aligned with said support structure, and by a connection arm, so as to keep front wheels of said wheelchair raised;

a power-assisted steering device comprising a support casing wherein an electric steering motor provided with a rotation shaft is inserted, said rotation shaft being provided at a free end with said counter-shaping, said counter-shaping and said hooking shaping being coupled to each other so as to have said rotation shaft operatively cooperate with said support structure and with said drive wheel, said support casing being provided with said fastener so as to make said auxiliary traction device integral with said power-assisted steering device, said auxiliary traction device further comprising a satellite control device configured such that a user can control movement of said electric steering motor; said auxiliary traction device being fastened, at said front, to said rotation axis of said rear wheels of said wheelchair by said hooking body, when said connection assembly is rotated to a position substantially aligned with said support structure, and by a connection arm so as to keep front wheels of said wheelchair raised, or said auxiliary traction device being fastened at said rear to said rotation axis of said rear wheels of said wheelchair by said hooking body, when said connection assembly is rotated substantially by 180° relative to said support structure, and by interposing a bracketing system;

a clamping bracket wherein said counter-shaping and said fastener are integrally defined, said counter-shaping and said hooking shaping being coupled to each other and said fastener being fastened to said second fastener so as to prevent rotation of said support structure and of said drive wheel relative to said connection assembly, said auxiliary traction device being fastened at said rotation axis of said rear wheels of said wheelchair by said first fastener, when said connection assembly is rotated in a position substantially aligned with said support structure, and by interposing a bracketing system.

9. The auxiliary traction system according to claim 8, wherein said manual steering device comprises, interposed between said steering tube and said counter-shaping, a cardan joint.

10. A method for fastening an auxiliary traction device according to claim 1 to a wheelchair, wherein said auxiliary traction device alternatively provides three fastening configurations:

a first configuration for fastening said auxiliary traction device at a front of a rotation axis of rear wheels of said wheelchair, said first configuration providing to:

rotate said connection assembly to a position substantially aligned with said support structure;

arrange said auxiliary traction device at a front of said wheelchair;

fasten, by said first fastener and a connection arm, said auxiliary traction device to said rotation axis of said rear wheels of said wheelchair, so as to keep front wheels of said wheelchair raised;

a second configuration for fastening said auxiliary traction device at said rotation axis of said rear wheels of said wheelchair, said second configuration providing to:

rotate said connection assembly to a position substantially aligned with said support structure;

arrange said auxiliary traction device underneath said rotation axis;

fasten said auxiliary traction device, by interposing a bracketing system, at said rotation axis of said rear wheels of said wheelchair;

a third configuration for fastening said auxiliary traction device at said rear of said rotation axis of said rear wheels of said wheelchair, said third configuration providing to:

rotate said connection assembly substantially by 180° relative to said support structure;

arrange said auxiliary traction device at said rear of said rotation axis;

fasten said auxiliary traction device, by interposing a bracketing system, at said rear of said rotation axis of said rear wheels of said wheelchair.

11. The method for fastening according to claim 10, wherein said first fastening configuration further comprises fastening a manual steering device to said auxiliary traction device, wherein said manual steering device comprises a tubular column and a steering unit provided with a steering tube rotatably inserted in said tubular column, said steering tube being provided at a first end thereof with a handlebar and at a second end, opposite to said first end, with a coupling counter-shaping complementary to said hooking shaping of said hooking body, said tubular column being provided with said fastener compatible with said second fastener of said connection assembly; said fastening providing to couple said counter-shaping and said hooking shaping, so as to have said handlebar operatively cooperate with said support structure and with said drive wheel, and fastening said fastener with said second fastener, so as to make said auxiliary traction device integral with said manual steering device.

12. The fastening method according to claim 10, wherein said first fastening configuration further comprises fastening a power-assisted steering device to said auxiliary traction device, wherein said power-assisted steering device comprises a support casing wherein an electric steering motor provided with a rotation shaft is inserted, said rotation shaft being provided, at its free end, with said counter-shaping complementary to said hooking shaping of said hooking body, said support casing being provided with said fastener compatible with said second fastener of said connection assembly; said fastening providing to couple said counter-shaping to said hooking shaping, so as to have said rotation shaft operatively cooperate with said support structure and with said drive wheel, and fastening said fastener with said second fastener, so as to make said auxiliary traction device integral with said power-assisted steering device; said first fastening configuration further providing to associate a satellite control device to said power-assisted steering device and to said auxiliary traction device, said satellite control device being configured such that a user can control movement of said electric steering motor and movement of said drive wheel.

13. The fastening method according to claim 10, wherein said second fastening configuration further provides to fasten a clamping bracket to said auxiliary traction device, wherein in said clamping bracket a counter shaping complementary to said hooking shaping of said hooking body is integrally defined, and a fastener compatible with said second fastener of said connection assembly; said fastening providing to couple said counter-shaping and said hooking shaping and fastening said fastener to said second fastener so as to prevent rotation of said support structure and said drive wheel relative to said connection assembly.

14. The fastening method according to claim 10, wherein said third fastening configuration further comprises fastening a power-assisted steering device to said auxiliary traction device, wherein said power-assisted steering device comprises a support casing wherein an electric steering motor provided with a rotation shaft is inserted, said rotation shaft being provided, at its free end, with said counter-shaping complementary to said hooking shaping of said hooking body, said support casing being provided with said fastener compatible with said second fastener of said connection assembly; said fastening providing to couple said counter-shaping to said hooking shaping, so as to have said rotation shaft operatively cooperate with said support structure and with said drive wheel, and to fasten said fastener with said second fastener, so as to make said auxiliary traction device integral with said power-assisted steering device; said first fastening configuration further providing to associate a satellite control device to said power-assisted steering device and to said auxiliary traction device, said satellite control device being configured such that a user can control movement of said electric steering motor and movement of said drive wheel.

* * * * *